United States Patent [19]

Ritter et al.

[11] Patent Number: 4,853,511
[45] Date of Patent: Aug. 1, 1989

[54] APPARATUS FOR THE FEEDING OF TRANSVERSE WIRES TO THE WELDING LINE OF A GRID WELDING MACHINE

[75] Inventors: Klaus Ritter; Gerhard Ritter; Rudolf Scherr, all of Graz, Austria

[73] Assignee: EVG Entwicklungs - U. Verwertungs-Gesellschaft M.B.H., Graz, Austria

[21] Appl. No.: 122,912

[22] Filed: Nov. 19, 1987

[30] Foreign Application Priority Data

Nov. 28, 1986 [AT] Austria .................. 3182/86

[51] Int. Cl.⁴ ............................................. B23K 1/00
[52] U.S. Cl. ...................................... 219/56; 219/58; 219/79
[58] Field of Search .................. 219/56, 57, 58, 79, 219/87; 140/112; 226/95, 97; 209/906, 932

[56] References Cited

U.S. PATENT DOCUMENTS

| | | | |
|---|---|---|---|
| 1,118,551 | 11/1914 | Honiss | 226/95 |
| 3,288,976 | 11/1966 | Sandret | 219/56 |
| 3,694,613 | 9/1972 | Ballard et al. | 219/57 X |
| 4,068,110 | 1/1978 | Larsson | 219/56 |
| 4,174,475 | 11/1979 | Senn | 219/56 |

FOREIGN PATENT DOCUMENTS

| | | | |
|---|---|---|---|
| 267293 | 12/1968 | Austria . | |
| 280019 | 3/1970 | Austria . | |
| 334168 | 1/1977 | Austria . | |
| 2622167 | 12/1977 | Fed. Rep. of Germany | 140/112 |
| 3517047 | 11/1986 | Fed. Rep. of Germany . | |
| 0237799 | 7/1986 | German Democratic Rep. | 140/112 |
| 0017380 | 1/1986 | Japan | 219/93 |
| 383305 | 10/1964 | Switzerland . | |
| 1098632A | 6/1984 | U.S.S.R. . | |
| 1224952 | 3/1971 | United Kingdom | 219/56 |

Primary Examiner—E. A. Goldberg
Assistant Examiner—Lincoln Donovan
Attorney, Agent, or Firm—Marmorek, Guttman & Rubenstein

[57] ABSTRACT

Apparatus for the feeding of transverse wires from a feed position to the welding line of a grid welding machine has at least one nozzle (9) which is directed towards the welding line, and which can be supplied with compressed air in time with the welding cycle. Parallel guides (5, 6) lead out from the nozzle, bounding either side of the transverse wire feed path, but ending ahead of the region of the welding electrodes. There are provided, in the region of the welding electrodes (1, 2), devices (11) preferably designed as magnets, for the catching and holding of the respectively fed transverse wire at the welding line. Conveyance with compressed air means that mechanical parts engaging in the welding area and susceptible to faults are avoided and at the same time changing of the longitudinal pitch of the transverse wires is facilitated.

10 Claims, 1 Drawing Sheet

APPARATUS FOR THE FEEDING OF TRANSVERSE WIRES TO THE WELDING LINE OF A GRID WELDING MACHINE

The invention relates to an apparatus for the feeding of transverse wires to the welding line, lying between rows of mutually adjustable welding electrodes, of a grid welding machine operating by the electrical resistance method, in which the transverse wires are first brought into a feed position arranged at a distance from the welding line.

In apparatuses of this generic type, the feed position is chosen close to the welding line, such that the transverse wire material is in each case delivered from a supply as favorably as possible during the implementation of a welding operation and, after completion of the welding operation and advancement by one step of the grid which is being produced, can be further conveyed as favorably as possible out of the feed position to the welding line. The transverse wires can, for example, be fired from one side of the machine into the feed position (cf. for example CH-A-383305) or pushed from above individually out of a magazine into the feed position (cf. for example U.S. Pat. No. 4,174,475). The further conveyance out of the feed position to the welding line may take place for example by means of grooved rotating transport wheels (cf. CH-A-383505), by means of substantially translationally moved transport rails (cf. for example AT-A-267293), by means of a piston cylinder unit (cf. U.S. Pat. No. 4,174,475) etc. Such feed apparatuses may be arranged above and/or below the grid production plane defined by that of the longitudinal wires, it being possible when the feed apparatuses are above and below the grid production plane, and if appropriate, for the two feed positions to be charged alternately with transverse wires with the aid of a common shooting apparatus and a "switch" arranged in the shooting path (cf. AT-A-280019).

This known transfer means, with the aid of which the transverse wires are conveyed out of the feed position to the welding line, has the prerequisite of an additional mechanism, engaging in the region of the welding electrodes, and which thus forms a potential source of faults. Furthermore, however, it also adversely affects the ability to convert the machine to the production of grids having different longitudinal wire spacings. If, namely, the electrode spacings are to be changed, in order to produce a grid having a changed longitudinal wire spacing, the spacings of the transfer means for the transverse wires must also be changed at the same time, increasing quite considerably the time expenditure required for the conversion of the machine.

The invention has the primary object of providing a transverse wire feed apparatus of the generic type specified in the introduction in such a way that no mechanical transfer means is necessary for conveying the transverse wires out of a feed position to the welding line.

According to the invention therefore there is provided apparatus for feeding transverse wires to the welding line in the grid production plane of an electrical resistance grid welding machine, said welding machine having plural rows of mutually adjustable electrodes, said welding line lying between said rows, and said machine having a feed position arranged at a distance from the welding line, to which the transverse wires are first brought in use, said apparatus comprising:

at least one compressed air nozzle at said feed position, directed towards said welding line for conveying said transverse wires in turn from said feed position to said welding line;

a plurality of parallel guides defining the sides of a transverse wire feed path and extending from said nozzle in the direction of said welding line, and having ends spaced from said welding electrodes; and, a plurality of devices, located in the region of the welding electrodes, for catching and holding the fed transverse wires at the welding line between the welding electrodes.

Owing to the replacement of the mechanical transfer means by a blow jet, the risk of operational faults is reduced and, moreover, the conversion of the welding machine to different longitudinal wire spacings is facilitated. It has been found that this type of conveyance of the transverse wires functions surprisingly well both in the case of thick and in the case of thin transverse wires which only cover a relatively small part of the nozzle openings, evidently because the conveying force required in the case of thin wires is that much smaller than in the case of thick wires that the increase in the amount of air leakage is not disruptive.

Within the scope of the invention, a long slot nozzle of a row of narrower nozzles arranged spaced apart may be used for transverse wire conveyance. For the catching and holding of the transverse wires conveyed by a compressed air impulse, permanent magnets or electromagnets, which can be excited in time with the welding cycle, are advantageously used, which offer the additional advantage that their force of attraction assists the maintenance of the correct direction of movement of the transverse wires and therefore makes possible a shortening of the guides adjoining the nozzle or nozzles.

One example of an apparatus according to the invention will now be described in more detail with reference to the accompanying drawings, in which.

Figure 1:
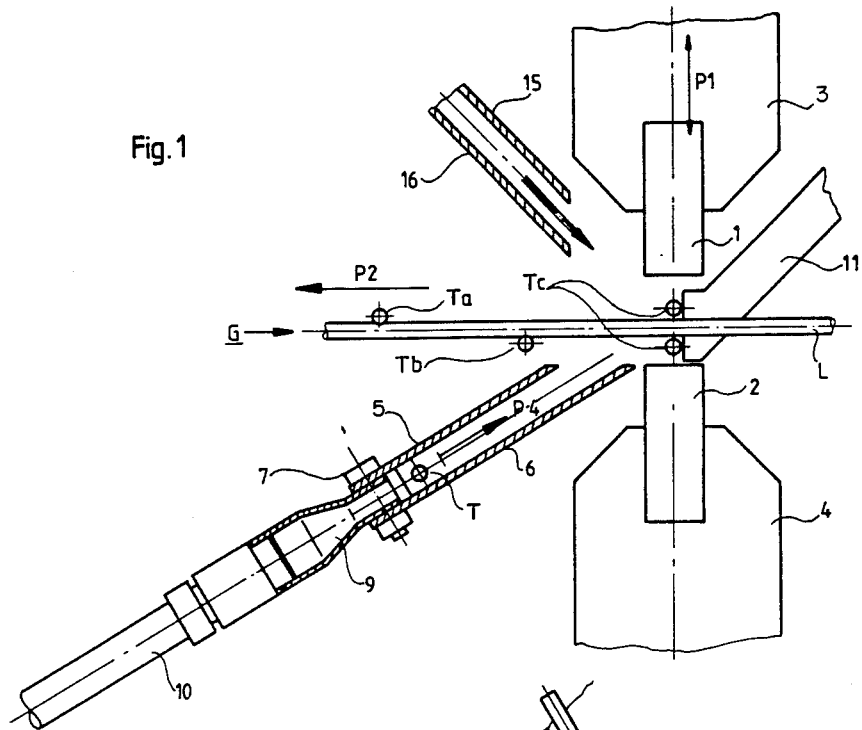
FIG. 1 shows a side view of an apparatus according to the invention.

FIG. 1 illustratess, in diagrammatic form, welding electrodes 1, 2, mounted on electrode carriers 3, 4, the upper electrode 1 being movable by means of its carrier 3, with respect to the stationary lower electrode 2, in the direction of the double-headed arrow P1. The grid G to be produced, which consists of longitudinal wires L and transverse wires T, crossing one another at right angles, is conveyed stepwise through the machine by known means in the direction of the arrow P2.

The arrangement of the transverse wires within the grid may be varied in the embodiment shown. For instance, there may be arranged only transverse wires Ta above the longitudinal wires L or only transverse wires Tb below the longitudinal wires L. Alternatively, as shown in FIG. 1, transverse wires Ta and Tb may be arranged alternately along the of longitudinal wires. Finally, it would also be possible, as is indicated between the welding electrodes, 1, 2, to arrange and weld on one transverse wire Tc above and one below the longitudinal wires L, in the same plane, normal to the grid longitudinal wires L, for instance whenever a high moment of resistance of the grid with respect to the plane defined by the longitudinal wire axes is required.

Figure 2:
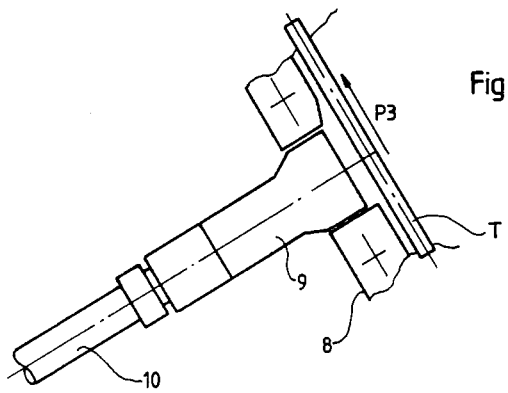
FIG. 2 shows a plan view of a nozzle which can be fed with compressed air, partly in section; and, FIG. 3 shows a plan view of the nozzle arrangement, on a smaller scale.

The transverse wires T may, as can be seen in FIG. 2, be shot from the side in the direction of the arrow P3 into a feed position between parallel guide plates 5, 6. The guide plates 5, 6 run in planes which form an acute angle with the plane of the welding electrodes 1, 2; they are secured by bolts and nuts 7 on carrying spaced apart elements 8. Fitted into the spaces between the carrying elements 8 are the outlet openings of nozzles 9, which can be supplied with compressed air from a compressor (not shown) via lines 10. For this purpose, electro-pneumatic valves (not shown), of known design, are inserted into the lines 10, which valves are controlled by the control device of the welding machine to supply the nozzles 9 with compressed air at the right time in the welding cycle.

Figure 3:
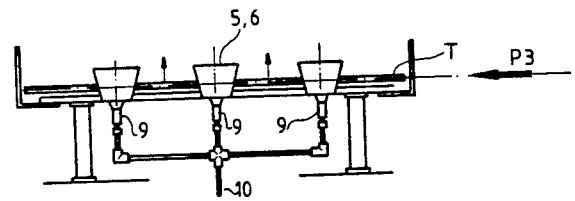

As FIG. 3 shows, the guide plates 5, 6 need only extend transversely over short distances on either side of their assigned nozzle 9, but they may alternatively extend continuously from nozzle to nozzle over the entire width of the machine.

When the nozzles 9 are supplied with compressed air, for example a transverse wire T cut off to a large length in advance by a cutter, in a known way, from a transverse wire strand being fed, is conveyed in the direction of arrow P4 in FIG. 1 to the welding line between the electrodes 1, 2, where its movement is stopped by catching and holding devices 11, forming stops. The devices 11 may be connected to selected electrode carriers 3 of the electrodes 1, distributed over the width of the machine, so that, in the event of a conversion of the machine from one longitudinal wire pitch to another, a separate setting step for these devices is not necessary. Since, however, in each case only a very small number of such devices is necessary, they could also be designed however as independent units fitted on the machine.

The devices 11 may be formed by retaining fingers controlled in time with the welding cycle. However, they are preferably designed as permanent magnets or as electromagnets which can be excited in time with the welding cycle of the machine, in order to prevent a rebounding of the transverse wires T and also to allow them to be used in the guidance of the transverse wires.

With arrangement of a second feed device above the advance path of the longitudinal wires L, which is indicated in FIG. 1 only by the guides 15, 16, both feed devices may be the same and may be supplied with transverse wires fed from the side, if appropriate alternately via a "switch". It would also be possible, however, to arrange one feed device, preferably the upper one, at the outlet opening of a magazine charged with a relatively large supply of straightly directed transverse wires cut to length and to convey the transverse wires by means of compressed air from the magazine outlet opening to the welding line.

We claim:

1. Electrical resistance grid welding machine, comprising
    a grid production plane for producing a grid, said grid production plane including a welding line,
    a plurality of rows of mutually adjustable electrodes disposed about said welding line,
    means for feeding transverse wires to said welding line, said feeding means comprising
    at least one compressed air nozzle directed toward said welding line for conveying transverse wires by compressed air to said welding line, said air nozzle being stationary and being located at a distance spaced from said welding line,
    a plurality of parallel guides defining a transverse wire feed path and extending from said compressed air nozzle in the direction of said welding line,
    said parallel guides having discharge ends spaced from said electrodes, and
    means located in the region of said electrodes for catching and holding the fed transverse wires at the welding line between said electrodes.

2. The machine of claim 1 wherein said grid production plane is horizontally disposed.

3. The machine of claim 1 wherein said nozzle comprises a slot nozzle extending at least over a substantial part of the width of said welding machine.

4. The machine of claim 1 comprising a row of spaced apart compressed air nozzles.

5. The machine of claim 1 wherein said guides are arranged in planes inclined at an acute angle to the plane of the row of electrodes.

6. The machine of claim 1 comprising at least one compressed air nozzle on each side of said grid production plane.

7. The machine of claim 1 wherein said means for catching and holding said transverse wires are permanent magnets.

8. The machine of claim 1 wherein said means for catching and holding said transverse wires are electromagnets energized in time with a welding cycle.

9. The machine of claim 1 wherein said electrodes have carriers distributed over the width of said machine, said means for catching and holding said transverse wires being mounted on said carriers.

10. The machine claim 1 wherein said machine includes a feed position for said transverse wires, said nozzle conveying said transverse wires by compressed air to said welding line.

* * * * *